United States Patent
Yehuda et al.

(10) Patent No.: US 7,023,848 B2
(45) Date of Patent: Apr. 4, 2006

(54) REARRANGEMENT OF DATA STREAMS

(75) Inventors: Eitan Yehuda, Zoran (IL); Idan Kaspit, Rosh Ha'ayin (IL); Eyal Shaked, Ganei Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 818 days.

(21) Appl. No.: 09/855,730

(22) Filed: May 16, 2001

(65) Prior Publication Data

US 2002/0006128 A1 Jan. 17, 2002

(30) Foreign Application Priority Data

May 16, 2000 (IL) ..................................... 136176

(51) Int. Cl.
*H04L 12/56* (2006.01)
(52) U.S. Cl. ..................................... 370/390; 370/411
(58) Field of Classification Search ................. 370/390, 370/535, 468, 473, 474, 394, 376, 385, 386, 370/392, 395.21, 398, 400, 401, 402, 411, 370/434, 519, 532, 536, 537, 540, 542; 375/267, 375/346, 347; 398/51, 79, 101; 709/203, 709/220
See application file for complete search history.

(56) References Cited

U.S. PATENT DOCUMENTS

| | | | |
|---|---|---|---|
| 3,786,192 A * | 1/1974 | Chow .......................... 370/376 |
| 4,417,244 A | 11/1983 | Melas |
| 4,754,454 A * | 6/1988 | Renner et al. ............... 370/220 |
| 5,119,368 A * | 6/1992 | Hiltner et al. ............... 370/376 |
| 5,303,267 A * | 4/1994 | Gupta .......................... 375/260 |
| 5,343,194 A | 8/1994 | Bowdan |
| 5,345,441 A | 9/1994 | Paker et al. |
| 5,359,601 A * | 10/1994 | Wasilewski et al. ........ 370/486 |
| 5,408,231 A | 4/1995 | Bowdan |
| 5,482,469 A * | 1/1996 | Seiceanu et al. ............ 439/188 |
| 5,497,363 A * | 3/1996 | Gingell ....................... 370/376 |
| 5,586,264 A * | 12/1996 | Belknap et al. ............. 725/115 |
| 5,862,135 A * | 1/1999 | Petty ........................... 370/376 |
| 5,987,027 A * | 11/1999 | Park et al. ................... 370/360 |
| 6,018,576 A * | 1/2000 | Croslin ..................... 379/22.03 |
| 6,034,947 A * | 3/2000 | Yoshida et al. .............. 370/244 |
| 6,233,075 B1* | 5/2001 | Chang et al. .................. 398/79 |
| 6,452,704 B1* | 9/2002 | Poustie et al. ............... 398/101 |
| 6,470,006 B1* | 10/2002 | Moulsley ..................... 370/347 |
| 6,487,169 B1* | 11/2002 | Tada ........................... 370/219 |
| 6,600,741 B1* | 7/2003 | Chrin et al. ................. 370/375 |
| 6,768,871 B1* | 7/2004 | Chang et al. .................. 398/51 |
| 6,781,985 B1* | 8/2004 | Feder et al. ................. 370/376 |
| 6,804,226 B1* | 10/2004 | Durant et al. ............... 370/355 |
| 2002/0075903 A1* | 6/2002 | Hind ........................... 370/503 |
| 2003/0099231 A1* | 5/2003 | Betts et al. .................. 370/369 |

FOREIGN PATENT DOCUMENTS

EP 0 999 653 A3 5/2000

\* cited by examiner

*Primary Examiner*—Phirin Sam
(74) *Attorney, Agent, or Firm*—Browdy and Neimark, PLLC

(57) ABSTRACT

A method and a system for errorless switching, in a telecommunication network, from a basic data stream to a copy of the basic data stream obtained by bridging of the basic data stream at a first network node, being characterized in that the switching is performed at a second network node receiving both the basic data stream and the copy data stream, upon performing an operation of delay equalization between the basic data stream and the copy data stream.

26 Claims, 5 Drawing Sheets

REARRANGEMENT OF DATA STREAMS

FIELD OF THE INVENTION

The present invention relates to a method and a system for switching and rearrangement of data streams transmitted in a telecommunication network. The proposed technology is preferably applicable to SONET/SDH telecommunication systems, though it can also be used in PDH systems.

BACKGROUND OF THE INVENTION

The Synchronous Digital Hierarchy (SDH) and its North-American equivalent, the Synchronous Optical Network (SONET), are the globally accepted, closely related and compatible standards for data transmission in the public wide area network (WAN) domain. Recently, SDW/SONET has also been adopted by the ATM Forum as a recommended physical-layer transmission technology for ATM (Asynchronous Transfer Mode) network interfaces.

SONET and SDH govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 μs (8000 frames/s). Because of compatibility between SDH and SONET, their basic frames are similarly structured, but differ in dimension, which fact reflects the basic transmission rates of 155.52 and 51.84 Mb/s, respectively. To be more specific, a basic frame format of SDH is 9 rows of 270 byte columns, or 2430 bytes/frame, corresponding to an aggregate frame rate of 155.52 Mb/s. For SDH systems, the mentioned basic frame transmitted at the rate 155.52 Mb/s forms the fundamental building block called Synchronous Transport Module Level-1. For SONET systems, the basic frame has dimensions of 9 rows by 90 bytes (270:3) and, being transmitted at the rate 51.84 Mb/s (155.52:3), forms the appropriate fundamental building block called Synchronous Transport Signal Level-1 (STS-1).

Both the SDH, and the SONET systems are based on the hierarchical principle of composing higher order signals (so-called high order virtual containers) from lower order signals (so-called lower order virtual containers). For example, the STM-1 signal, according to SDH mapping scheme, contains a signal called AU-4 that, in turn, carries a signal VC-4. The virtual container VC-4 can be mapped from a number of lower order signals. In SONET system, the STS-1 signal contains a signal AU-3 that in turn carries a signal VC-3. Similarly, the VC-3 can be composed from several lower order signals.

SDH also includes signals of Synchronous Transport Level 4, 16 and 64 (so-called VC4-N) which constitute 4, 16 or 64 independent VC-4 signals. An analogous arrangement exists in SONET (signals STS-3, STS-12, STS-48 etc.)

SDH and SONET are known to support data streams having rates higher than the fundamental building block If there are services requiring a capacity greater than 155 Mbps, one needs a vehicle to transport the payloads of these services. In SDH, so-called concatenated signals, for example VC4-Nc, are designed for this purpose. STM-4 signal having a data rate 622.08 Mb/s (4×155.52 Mb/s) is one of the high order signals in the SDH system. Payload of the STM-4 signal is generated by byte-interleavingly multiplexing four payloads of STM-1 (or four AU4, or four VC4) signals. Concatenated VC4 (VC4-Nc) is characterized by a common synchronous payload envelope being the N-fold VC4 signal, and by a common column of service bytes called POH (Path Overhead); for transmitting, such a signal needs a number of adjacent time-slots.

Operation of rearrangement is known in SDH/SONET signals transmission.

For transmitting a number of SDH signals, say, 10 independent VC4 containers via a telecommunication link such as an optic link, a well known TDM (Time Division Multiplexing) principle is used.

According to this principle, a byte-interleaving multiplexer intermittently transmits bytes of the 10 containers via an optic link in a manner that specific time slots are assigned to bytes of the respective specific containers. Let the optic link allow for transmitting bytes in 16 timeslots, with a frequency 2.5 GHz, which is sufficient for a high rate SDH signal STM16. For example, the initial arrangement at the transmitter side is such that bytes of VC4 containers Nos. 1 to 5 are sent in respective time slots 1 to 5, and bytes of VC4 Nos. 6 to 10 are transmitted in time slots 9 to 13.

Suppose, that a new signal should be transmitted via the same optic link, and the bandwidth of the link would theoretically allow it (i.e., there are vacant time slots). However, a simple sum of the vacant time slots might be insufficient for transmitting the new signal if it requires several adjacent (sequential) slots. For example, a concatenated signal VC4-4c requires 4 adjacent time slots for its transmission, and in our example we don't have such slots available. It would therefore be useful to regroup the transmitted 10 separate VC4s so as to free one window of four consequent time slots for transmitting the new, concatenated signal.

In another example, two AU4 virtual SDH containers are transmitted via a link, and neither of them is "fully packed": each AU4 signal contains 30 lower order signals (containers) TU12. It should be noted that according to the SDH hierarchy, 63 TU12 signals might be mapped in one AU4 container. Could all the TU12s be rearranged into one of the AU4 containers, the second AU4 container would be vacant for transmitting an additional signal, for example a new VC4 signal that requires almost the whole AU4 capacity. (One AU4 container comprises one VC4 container and an additional 9-byte row of so-called Administrative Unit pointers that serve, inter alia, for allocating the beginning of a VC4 payload in the frame of the transmitted signal).

It should also be emphasized that the rearrangement, if needed, is to be provided while the traffic proceeds i.e., without affecting it.

Some technologies of rearrangement are described in the prior art, and all of them relate to complex procedures to be performed inside a so-called cross-connect network element.

For example, U.S. Pat. No. 5,987,027 to Alcatel describes a connection procedure for finding by rearrangement a path for multirate, multicast traffic through an SDH cross-connect. If no free path for a new payload through the SDH switching hardware is available, the switching procedure looks for a path that is adequate and blocked by the least existing payload capacity. Connections for existing payloads that must be moved to make way for the new payload are queued and the connection procedure is applied recursively, to each in turn, until the queue is empty.

U.S. Pat. No. 5,408,231 to Alcatel Network Systems relates to a method and system for finding a path through a communication matrix (forming part of a cross-connect network element), preferably in a rearrangeable matrix. The method performs a so-called process of pumping the input stage array, output stage array and center stage array of the matrix using information on the idle input link array and the idle output link array to determine an optimal center stage switch.

U.S. Pat. No. 5,343,194 to Alcatel Network Systems also discloses a method to immediately connect and reswitch connection configurations through a rearrangeable communications matrix, using an optimization procedure that targets the minimal possible rearrangements.

U.S. Pat. No. 5,345,441 to AT&T Bell Laboratories describes a procedure of hierarchical path hunt for establishing a switched connection of a given bandwidth as a collection of a plurality of connections of smaller bandwidths of different sizes. The path hunt uses a hierarchy of status tables, corresponding to the hierarchy of rates, for each time switching element in the network. To maximize the path-hunt efficiency while maintaining non-blocking performance, the path-hunt follows a search hierarchy for lower-rate connections that first searches for matching partially full time-slot entries in higher rate status tables, and uses idle time-slot entries in higher-rate status tables only as a last resort.

U.S. Pat. No. 4,417,244 to IBM corp. discloses yet another method for rearranging a three stage (primary, intermediate, tertiary) switching network to permit data to be transmitted from any primary outlet to any given tertiary inlet. Two call rearranging buses are provided to assure that each signal path being rearranged is maintained to prevent data transmission dropout. Primary to intermediate and intermediate to tertiary paths are rearranged one at a time using the call rearranging buses to move free primary and tertiary links to a single intermediate matrix. It should be noted that, for rearrangement, some existing connections are to be broken and then made again in a queue.

U.S. Pat. No. 5,482,469 relates to a dual monitor self-contained six port digital signal cross-connect module. There is described an internal arrangement of a housing with a compact, self-contained, six jack port, dual monitor, digital signal cross-connect switching module. A first monitor jack port and a second monitor jack port are mounted in the housing, each being adapted to receive an electrical plug. A plurality of modules comprise a system having provisions for cross-connect switching, rerouting, repair, patch and roll and monitoring. The six jack port digital switching module paired with a like unit has an input jack port, an output jack port, a cross-connect input jack port, a cross-connect output jack port, and four multi-purpose monitor jack ports. Each makes a make before brake switch providing without a loss of signal, the means for bridging, disengaging, isolating, connecting respective conductors and terminating input and output signals when an electric plug is inserted into a suitable jack port. Though U.S. Pat. No. 5,482,469 is declared as intended for monitoring, testing, maintenance, installation and the like of electrical signal transmission systems, its description is focussed on internal assemblage of the housing and does not address the procedure of performing the connections. It therefore does not provide information to judge whether the re-connection is really provided without any loss of signal.

U.S. Pat. No. 6,018,576 relates to a method and an apparatus for automated node-based normalization after restoration of a network. After a failure in the network is repaired and a specified time period is passed, the end nodes perform a sequence of tasks to execute a modified form of a path-and-roll normalization. The process of switching from the restoral route to the original fixed route is performed under the patch-and-roll method, according to which each end node transmits traffic over both a restoral route and the original traffic route that has been fixed. Each end node confirms receipt of signals over the fixed traffic route. Thereafter, each end node switches to receiving live traffic from the restoral route to the fixed traffic route and stops transmitting over the restoral traffic route. According to U.S. Pat. No. 6,018,576, the end nodes finally instruct the other nodes along the restoral route to disconnect the restoral route. The confirmation message ensures that both of the end nodes receive the live traffic over the original, fixed traffic route so that at no time is traffic disrupted in the network. However, U.S. Pat. No. 6,018,576 neither describes nor suggests how the goal of non-disruption of the live traffic in the network can really be achieved.

It is therefore the situation that so far no errorless on-line rearrangement and switching procedure is described in the art. Usually in practice, an NDF alarm (New Data Flag) accompanies any rearrangement process in SONET/SDH. This alarm manifests the presence of a so-called frame slip which becomes sensible in a period of approximately three standard frames after the switching is done, and indicates that the rearranged data streams are "seamed" defectively.

SUMMARY OF THE INVENTION

It is therefore the object of the invention to provide a method and a system for substantially errorless rearrangement and switching of data streams in the traffic following via a telecommunication path in a telecommunication network, The method is advantageous in that it allows errorless rearrangement for transmitting one or more extra data streams via the path, and/or allows network optimization to be provided by errorless switching one or more data streams to alternative routes in the network. The data streams mentioned in the present application are preferably SDH/SONET or PDH data streams.

To achieve the above object, there is provided a method of errorless switching, in a telecommunication network, from a basic data stream to a copy of the basic data stream obtained by bridging of the basic data stream at a first network node, the method being characterized in that the switching is performed at a second network node receiving both the basic data stream and the copy data stream, upon performing an operation of delay equalization between the basic data stream and the copy data stream.

In the most preferred version of the method, it is applied for on-line rearrangement of an original data stream composed of two or more fragment data streams (so-called basic fragments) transmitted in respective time-slots, wherein some vacant data slots exist in the original data stream; the method is characterized in that the rearrangement is decentralized, i.e., performed using the first and the second network nodes interconnected by a telecommunication path, wherein at least one of said basic fragments is bridged at the first node to obtain a copy fragment, said basic fragment and said obtained copy fragment are transmitted to the second node and wherein, at the second node, said copied basic fragment is dropped upon equalizing delays between it and its copy fragment, thereby ensuring substantially errorless rearrangement and obtaining a rearranged data stream.

It has been found by the inventors that probability of appearance of NDF alarm is reduced to the very minimum in the proposed method. To date, only the use of the described method ensures the absence of the NDF alarm while performing the on-line rearranging of SDH/SONET data streams.

The telecommunication path is, in general, any telecommunication link having capacity not smaller than the maximal capacity of the original data stream with the vacant data slots. The telecommunication path may comprise one or more transmission lines.

According to a practical solution of the rearrangement problem, during transmission of a data stream via a network, the method includes the following steps:

at the first node:
bridging at least one of said basic fragments, each occupying an original time-slot in the original data stream so as to make each of said at least one bridged basic fragments occupy also a respective vacant time slot, thereby producing at least one additional fragment called a copy fragment in at least one respective vacant time slot;
multiplexing all basic fragments of the original data stream with said at least one copy fragment into the form of an intermediate data stream, wherein the intermediate data stream includes fragments occupying all the original (initially occupied) time-slots and said at least one vacant time slot;

transmitting the intermediate data stream from the first node to the second node over the telecommunication path;

at the second node:
demultiplexing the intermediate data stream,
defining at least one pair of bridged fragments, each pair comprising a particular basic fragment occupying one of said original time-slots, and a copy fragment of said basic fragment, occupying one of said vacant time-slots;
equalizing delays between the basic fragment and the copy fragment in each of said pairs;
assembling an outgoing data stream, using said at least one copy instead of the respective at least one basic fragment, thereby obtaining the rearranged original data stream comprising at least one fragment which changed its original time-slot.

The above method may terminate with freeing said at least one original time slot at the first node, for transmitting there-through one or more new signals. However, the operation of freeing these original time-slots at the first node may actually be accomplished automatically when applying a new signal to be transmitted there-through. The multiplexing is preferably provided according to the Time Division Multiplexing technique.

It has been realized by the inventors, that the main contribution to the effect of the errorless rearrangement is made by the delay equalizing operation provided between each of said copy fragments and its corresponding basic fragment.

It should be noted, that the method may be accomplished in various modes. If it is effected in one stage, "n" basic fragments are simultaneously bridged to free "n" original time-slots required for transmitting a new signal. In an alternative mode, the method is effected by stages when one or more basic fragments are bridged at a time so that a part of the required original time-slots is freed, and the whole cycle is repeated up to the required number of the original time-slots are cleared for transmitting a new signal(s).

Preferably, the step of bridging in the first node is performed by entering each of said at least one basic fragments to an input of a cross-connect device (a switching matrix thereof), providing a pair of connections in the cross-connect device for each of said fragments to connect its associated input to a pair of outputs, and outputting from the pair of outputs a bridged pair of identical fragments for further multiplexing them in two different time-slots.

The step of multiplexing just ensures that one fragment of each of the bridged pairs occupies the original time-slot of the bridged basic fragment, and the other fragment (i.e. the copy) occupies a vacant time-slot.

The step of freeing said at least one original time-slots is accomplished for each particular slot by canceling one of the pair of connections in the cross-connection device so, that the output corresponding to the particular basic time-slot is disconnected from its corresponding input. It means, that inputs of all "copied" basic fragments to the cross-connect device will remain connected only with outputs associated with vacant time-slots. The cleared "original time-slots" outputs can now be re-connected to any vacant inputs of the cross-connect device for receiving a new signal.

In the most preferred version of the method said delay equalizing operation comprises a step of pointers' justification with respect to at least one copy fragment and its corresponding basic fragment, and wherein pointers of said basic fragment and the corresponding copy fragment serve mutual references to one another.

Upon obtaining information on actual pointers' position in respective standard frames of a pair the bridged data streams, positions of the pointers are mutually adjusted, thereby synchronizing payloads of standard frames of the pair of the bridged data streams.

According to a second aspect of the invention, there is provided a system for errorless switching, in a telecommunication network, from a basic data stream to a copy of the basic data stream obtained by bridging of the basic data stream; the system comprises a first network node interconnected with a second network node via a telecommunication path; said first node being capable of bridging said basic data stream, said second network being intended for receiving both the basic data stream and the copy data stream; the system also comprising a network management block and a delay equalizing means operative to perform delay equalization between the basic data stream and the copy data stream before dropping the basic data stream.

According to the preferred embodiment of the system, it forms part of a system for on-line rearranging an original data stream composed of original fragment data streams (basic fragments) transmitted in respective original time-slots while one or more vacant data slots exist in the original data stream; in this embodiment, said basic data stream constitutes one of said basic fragments, and said copy data stream constitutes a copy fragment occupying one of said vacant time slots and obtained by bridging said basic fragment.

As above, the data stream is preferably an SDH/SONET or a PDH data stream, The telecommunication path is, in general, any telecommunication link having capacity not smaller than the maximal capacity of the original data stream with the vacant data slots. The telecommunication path may comprise one or more transmission lines.

According to one preferred embodiment, each of the nodes (the $1^{st}$ node and the $2^{nd}$ node) includes a Network Element (NE) comprising a cross-connect device (being a switching matrix) having an input stage and an output stage, and a control unit. More particularly, the $1^{st}$ node is provided with a MUX unit connected to the output stage of the $1^{st}$ cross-connect, and the $2^{nd}$ node is provided with a DEMUX unit connected to the input stage of the $2^{nd}$ cross-connect. The $2^{nd}$ node is also provided with the delay equalizing means, which is preferably connected between the DEMUX and the $2^{nd}$ cross-connect. The intermediate communication link preferably couples the output of MUX with the input of the DEMUX.

It should be noted that the MUX unit may comprise one or more multiplexers. For example, TDM Multiplexer may constitute a number of TDM MUM blocks arranged in one or more cascades. Analogously, the DEMUX unit may contain one or more demultiplexers (say, a TDM DEMUX or a cascade thereof).

Functionality of the system can be defined as follows:

The $1^{st}$ cross-connect of the first node must be capable of copying "n" fragments of the original data stream to form respective "n" additional data fragments (copy fragments) and connecting said copies to such outputs at its output stage to make them occupy "n" respective vacant time-slots; the $1^{st}$ cross-connect being also capable of transparently transmitting all the basic fragments of the original data stream through its switching matrix to preserve their respective original time-slots;

the MUX of the first node is operative to multiplex the fragments being output from the $1^{st}$ cross-connect into an intermediate data stream, and to transmit it over the intermediate telecommunication path;

the DEMUX of the second node being capable of receiving and demultiplexing the intermediate data stream for forwarding the obtained fragments to the $2^{nd}$ cross-connect;

said delay equalizing means are responsible for time aligning between each pair of copied fragments received from the DEMUX.

The network management block, via the network nodes' control units, is responsible of causing:

the $1^{st}$ cross-connect to double one or more ("n") particular basic fragments so as to output all the fragments of the original data stream and copies of the "n" fragments, the MUX to create the intermediate data stream from the fragments outputted from the $1^{st}$ cross-connect, and the DEMUX to restore them after transmission, the means for equalizing delays, to process said particular basic fragments and their respective copy fragments in a predetermined order;

the $2^{nd}$ cross-connect to form the outgoing data stream comprising the rearranged original data stream wherein said "n" basic fragments are replaced with said "n" copies.

The forming of the rearranged data stream outgoing from the $2^{nd}$ cross-connect is performed by causing said $2^{nd}$ cross-connect to create internal connections only for the copies and not for the copied basic fragments. The freeing of the data slots corresponding to the "n" basic fragments at the $1^{st}$ node can be achieved by causing the $1^{st}$ cross-connect to drop the "original, direct" connections which existed between the input stage and the output stage of the $1^{st}$ cross-connect for the "n" basic fragments before the beginning of the rearrangement process.

In the most preferred embodiment of the system, the delay equalization means comprises at least one unit capable of performing pointers' justification for a pair of bridged fragments, by using thereof as reference for one another. Such a unit may serve for equalizing delays of one bridged pair at a time, and be used cyclically under supervision of the control unit.

Further aspects of the invention, for example those concerning the delay equalization operation and means, will become apparent as the description proceeds.

BRIEF DESCRIPTION OF THE DRAWINGS

The invention will be further described and illustrated with the aid of some exemplary embodiments and with reference to a number of non-limiting drawings listed below.

DETAILED DESCRIPTION OF THE PREFERRED EMBODIMENTS

The present invention will further be described in more detail using an example of an SDH data stream transmission. The original data stream comprises a number of fragment data streams (in the frame of this application, a number of so-called basic fragments) transmitted in respective original time slots.

Figure 1:
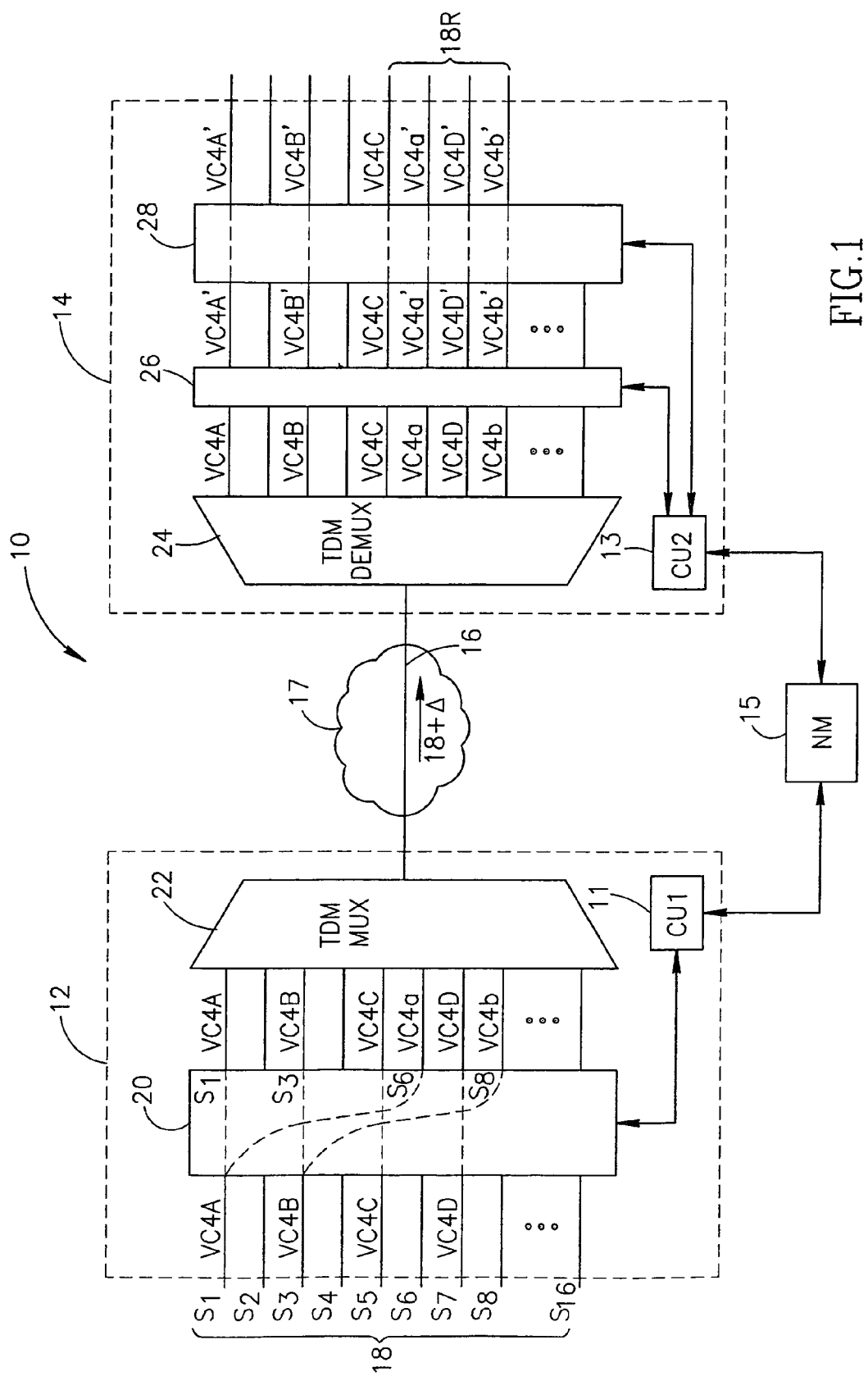
FIG. 1 shows a schematic block-diagram of an exemplary system implementing the method according to the invention.

FIG. 1 illustrates a schematic block-diagram of the basic embodiment 10 of the proposed system for rearrangement of data streams. The system comprises a $1^{st}$ node 12 connected to the $2^{nd}$ node 14 by a telecommunication path 16 in a network 17, in this embodiment the path constitutes a single transmission link. It should be noted that two or more parallel links may be provided to interconnect the nodes 12 and 14. The system also comprises a network manager block 15 connected to control units 11 and 13 of the first and second nodes, respectively. An incoming original data stream, generally marked 18, arrives to the system in the demultiplexed form. For example, the original data stream carries eight fragment data streams (fragments) VC4 occupying all odd time-slots (schematically indicated as S1, S3, S5 . . . S15) from the available sixteen time slots of the original data stream. All even slots of the data stream are vacant (S2, . . . , S16). Suppose that it is now required to transmit a new signal VC4-4c (a concatenated data stream) using the timeslots which remain available in the original data stream. (Examples of the particular data streams in the drawings are not limiting). We remember that the mentioned new signal called VC4-4c needs four consequent time-slots for its transmission. Though there are eight vacant time-slots in the data stream 18, the requirement cannot be met at the present arrangement, since the vacant time-slots are "loosely spread" over the data stream. To resolve the problem, the following exemplary system is proposed by the invention. All the basic fragments are applied to the input stage of a cross-connect 20 of the first node 12 (i.e., the $1^{st}$ cross-connect). In this example, the cross-connect 20, under control of the network manager 15 via the control unit 11, copies (doubles, or "bridges") two fragments following in the time-slots S1 and S3 so that at the output stage of the cross-connect 20 two identical fragments can be found for each basic fragment. In particular, the 1st cross-connect 20 performs connections so that the basic fragment VC4A appears at the output stage at a contact assigned to the time slot S1, and a copy fragment VC4a appears at a contact of the output stage, associated with the time-slot S6. In this particular example, the number of the basic fragments which has been copied is equal to 2 i.e., n=2. A TDM multiplexer 22 provides multiplexing of all the fragments outgoing from the output stage of the cross-connect 20, according to their assigned time slots and transmits via the communication link 16 an intermediate data stream marked 18+Δ. The intermediate data stream comprises all the fragments of the original data stream 18 and additional two copied fragments (VC4a and VC4b). At the second node 14, a TDM demultiplexer 24 splits the intermediate data stream into the component fragments, whereupon the delay equalization is provided in block 26. In this example, the delay equalization is effected for the two copied pairs of fragments: VC4A relative to VC4a, and VC4B relative to VC4b. The delay equalizing block 26 is controlled by the control unit 13 and is capable of applying its functions to any pair of fragments indicated by the control unit. The fragments, which underwent the delay equalization, are marked with (') in FIG. 1. The control unit 13 ensures that the $2^{nd}$ cross-connect 28 takes care of all fragments except for the fragments VC4A' and VC4B' (i.e., no output contacts are created for these two fragments at the output stage of the cross connect 28).

As a result, at the output stage of the $2^{nd}$ crossconnect (28) in the node 14, the rearranged data stream 18R is formed. It can be seen that two copies VC4a' and VC4b' are picked for the stream 18R while the original corresponding fragments are disregarded; the basic fragments which were not copied stay in the rearranged data stream. The next stage of the process will be schematically illustrated in FIG. 2.

Figure 2:
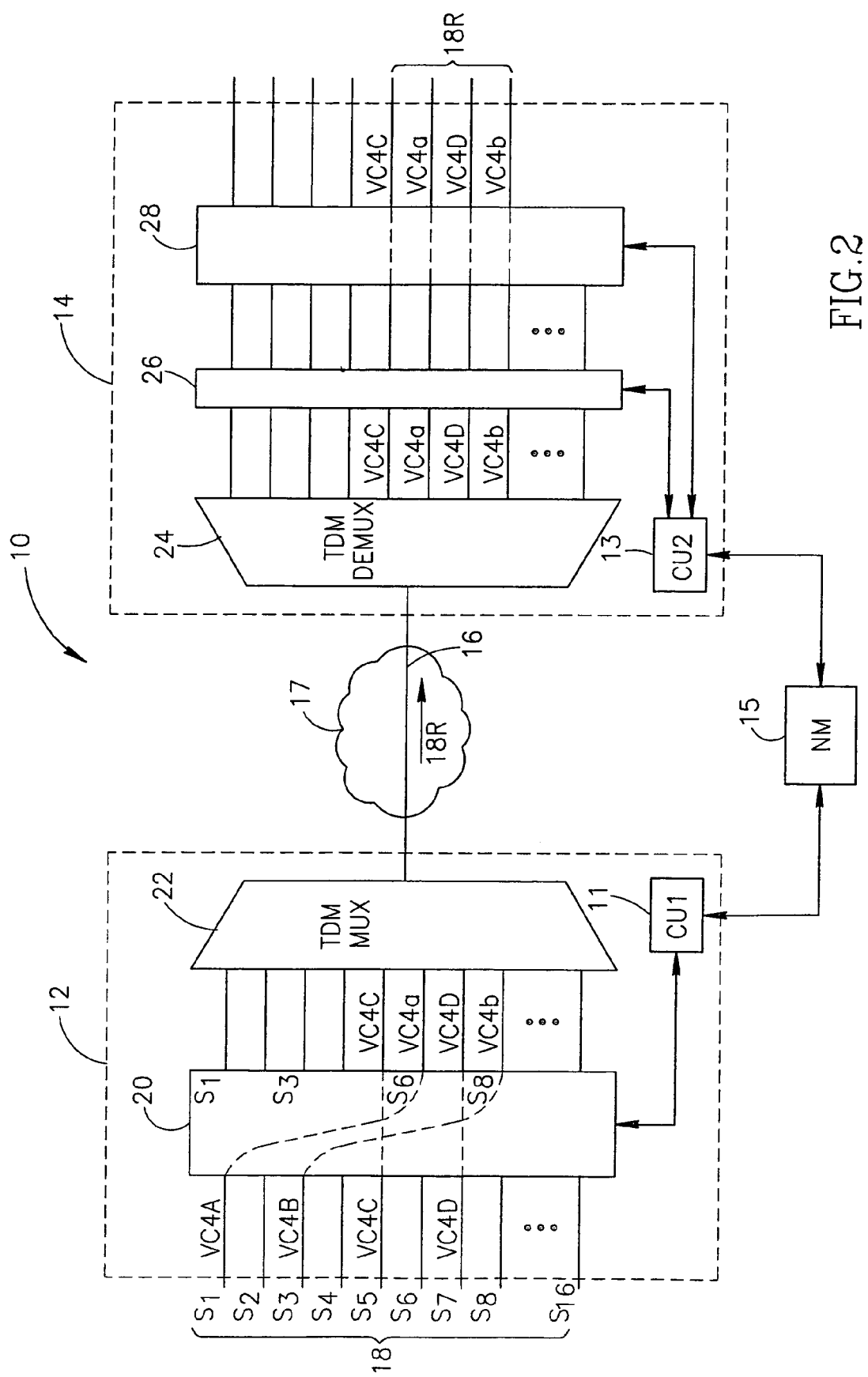
FIG. 2 schematically illustrates the rearranged data stream and the freed time-slots ready for transmission of a new signal in the bandwidth of the original data stream, using the bloc-diagram of FIG. 1.

FIG. 2 shows the block-diagram of FIG. 1 with changes which can be introduced upon forming the rearranged data stream 18R. The control unit 13 of the second node communicates with the network manager 15, and the latter instructs the control unit 11 of the first node. The $1^{st}$ crossconnect 20, according to a command provided by the control unit 11, drops internal connections between the incoming "n" original data fragments and the outputs assigned to their original time-slots. Consequently, the intermediate data stream becomes equal to the rearranged data stream and, beginning from the output stage of the $1^{st}$ cross-connect 20 up to the output stage of the $2^{nd}$ crossconnect 28, the first four time-slots S1 to S4 become vacant. The rearrangement is completed. One of the results is that the network is optimized. Actually, optimization of the network may be the sole object of the rearrangement operation. One example of rearrangement provided in order to optimize transmission of the initial data stream in the network between two reference nodes will be illustrated in FIG. 4. The system shown in FIG. 2 is now ready for transmitting a new signal in addition to the rearranged data stream. The following stage is illustrated in FIG. 3.

Figure 3:
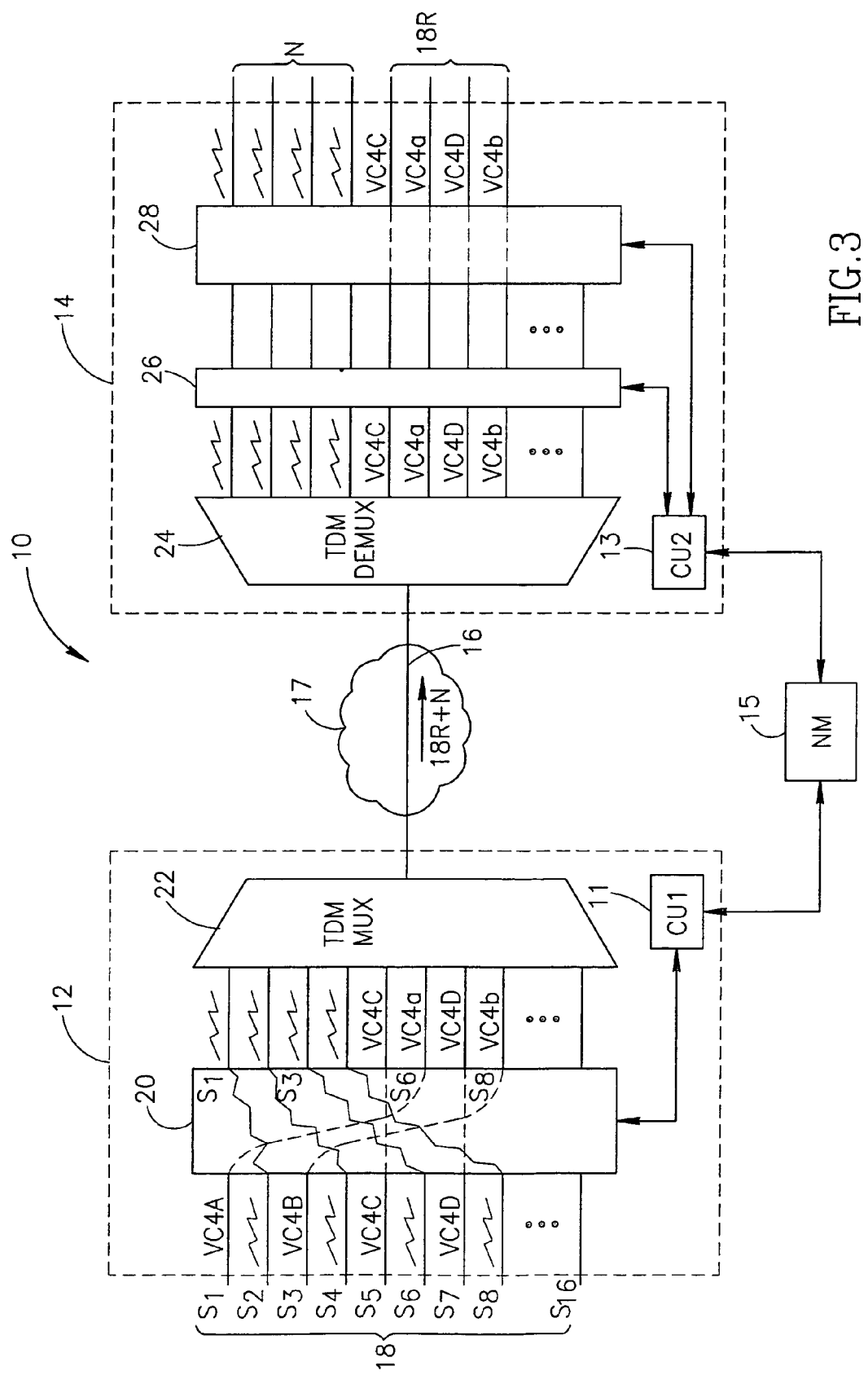
FIG. 3 schematically illustrates transmission of a new signal together with the rearranged original data stream.

FIG. 3 depicts how a new signal N consisting of four fragments (schematically depicted as four waved lines) can be applied to the system 10 and be transmitted via four consequent time-slots together with the original data stream 18. The step of switching the new signal "in" requires new connections to be created in the $1^{st}$ cross-connect, so it may actually replace the step of dropping the excessive connections. Indeed, creating a new connection to an output contact of the cross-connect will automatically cause dropping of any previous connection if existed at this contact.

Figure 4:
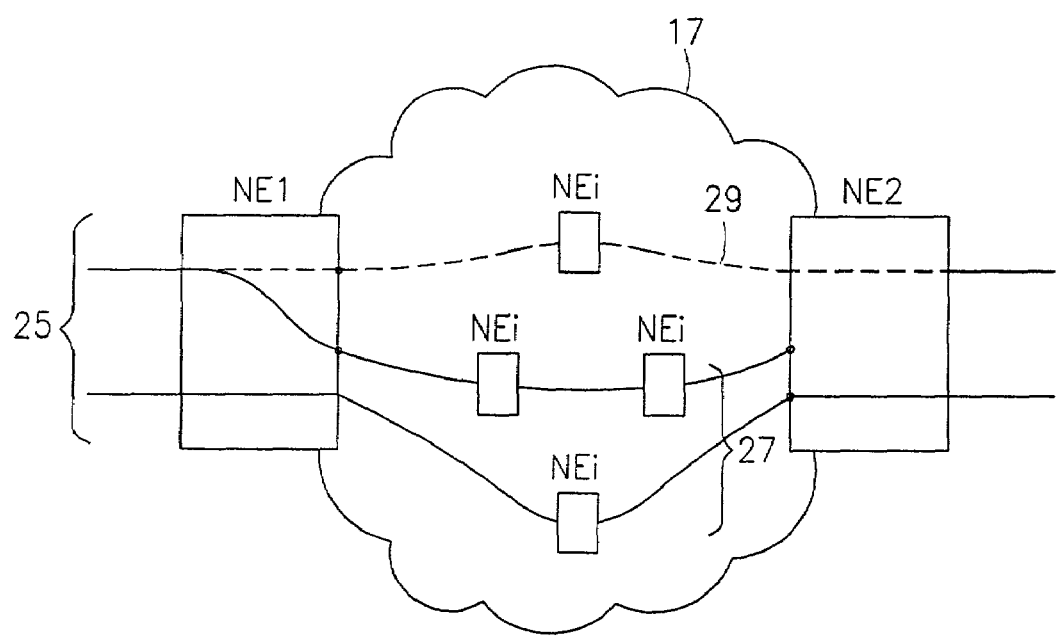
FIG. 4 schematically illustrates rearrangement in a network for the network optimization.

FIG. 4 illustrates how the rearrangement procedure can be used for network optimization. Suppose an original data stream 25 enters a first end-node (Network Element N1 comprising a cross-connect matrix) and is transmitted therefrom via the network 17 (say, IP) to a second end-node (Network Element N2 comprising a cross-connect matrix).

In this example, the data is transmitted between the nodes N1 and N2 in the form of an intermediate data stream capturing two routes in the network. These two routes form together a combined transmission path 27. Each of the routes has an individual number of intermediate network elements $NE_i$ and, therefore, has its individual transmission properties. Alternative routes may exist in the network, which could be capable of providing other conditions of transmission (say, at least one of the alternative routes may be shorter and/or comprise a smaller number of intermediate network elements than one of the existing routes; for example—route 29 seems preferable than the actual route having two intermediate $NE_i$). If such routes are found, the data stream can be rearranged on-line, similar to that as described above.

In other words, the network optimization can be provided for a data stream comprising at least one fragment routed via a basic route in the network between a first node and a second node, by bridging said at least one fragment at the fist node to obtain a copy of the fragment, routing said copy via an alternative preferred route in the network (for example, by using free outputs and inputs of the end-node crossconnects), performing a delay equalization operation with respect to the fragment and its copy at the second node, and abandoning said basic route while preserving said alternative preferred route. In other words, the second node NE2 performs a switching operation with delay equalization, so that the copy fragment precisely identical to the basic fragment will be used. One embodiment of the precise delay equalization means will be described below.

Figure 5:
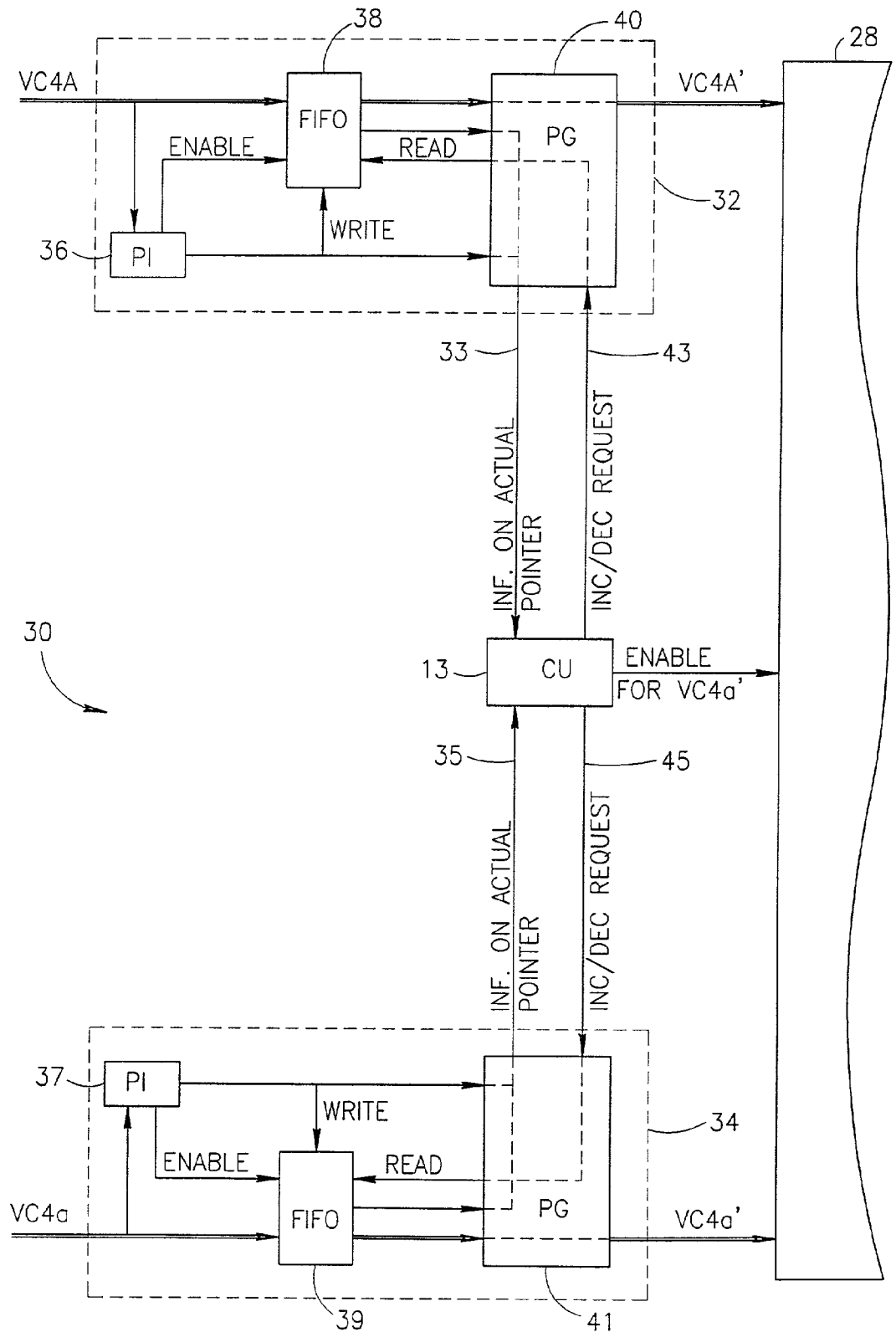
FIG. 5 illustrates a schematic block-diagram explaining the principle of delay equalization using pointers' justification.

FIG. 5 illustrates how the delay-equalizing step can be accomplished when performing switching or rearrangement of SDH/SONET signals. In this embodiment, a unit for equalizing delays of a particular pair of bridged fragments is based on a so-called pointers justification operation, using FIFO blocks with controllable depth. In general, the delay equalizing means may comprise any delay difference minimizing block fulfilled by a precise delay equalization unit such as the one illustrated. In the most powerful delay equalization means there are as many units as required to perform the delay equalization for all fragments outgoing from a particular DEMUX (see FIGS. 1 to 3). However, the simplest delay equalizing means may comprise only one such unit. The single unit can be used for performing errorless network optimization when one route is replaced with another; in case a number of fragments are to be rerouted (say, for a data stream rearrangement), the errorless switching will be performed step by step. It should be mentioned that though, for the sake of simplicity, the fragments in this patent application are called and illustrated as VC-n containers of SONET/SDH, each of them comprises pointers and thus actually comprises either an AU-n container for high order signals, or TU-container for low order ones.

FIG. 5 shows a block diagram of a single unit (marked 30) of the delay equalization means; the unit can be implemented by means of hardware & software. Let in this particular embodiment the rearrangement is provided for transferring a data stream fragment originally transmitted in one (original) time slot, to another (vacant) time slot. To this purpose, the unit is operative to take care of two fragments: VC4A transmitted in the original time-slot and VC4a (a copy fragment of VCA) transmitted in a vacant time-slot. According to the invention, two symmetric branches of the unit simultaneously take care of a pair of bridged fragments. As has been mentioned, the delay equalization of the fragments is preferably implemented using a so-called operation of pointers' justification.

In general, the operation of AU (Administrative Unit) pointers' justification is known in the theory and practice of SONET/SDH. Position of AU pointer bytes in the standard frame of a data stream indicates where the informational payload begins in this frame (i.e., position of the pointer indicates the floating phase and consequently, the timing of the payload). The operation of pointers' justification allows shifting the position of the informational payload's beginning by deliberately changing offset of its pointer bytes by stuffing. According to this principle, a positive pointer justification (so-called increment) can be applied for retarding a next frame payload of a particular fragment data stream. In an analogous manner, a negative justification (decrement) can be used for accelerating a next frame payload in a particular fragment.

To align a basic fragment VC4A and its copy VC4a from the point of delay, the proposed block-diagram of the delay equalizing unit 30 utilizes two symmetric branches 32 and 34, where each of them performs functions of a so-called adaptation layer known in the procedure of processing SONET/SDH signals. The branches are interconnected via a control unit, for example via the control unit 13 of the second node 14 (see FIG. 1). Depending on the incoming signal which may be either a high order signal or a low order signal, and depending on the position of its pointers indicating the initial increment/decrement in the fragment's particular frame (and, consequently, the beginning of the payload therein), branch 32 (34) enables writing the current payload into a FIFO 38 (39), sets clocks of the FIFO and of the output signal, and prepares pointers' generation for a suitable outgoing signal. It should be noted that states (depths) of FIFOs in the two different branches may "historically" differ from one another due to different positions of pointers in previous frames, and may therefore result in different positions of pointers of the outgoing signals.

To avoid such a discrepancy, in addition to the adaptation functions performed by each of the branches with respect to its fragment, the branches interact via the control unit to exchange information on the prepared outgoing pointers, so that the two fragments (i.e., standard frames thereof) serve as mutual references to one another. Based on the information received by the CU, clock of the FIFO (the read clock) of one branch can be changed to be synchronous with the clock of the other branch.

For example, a fragment comprising VC4A (which initially occupied one of the original time-slots) enters branch 32 of the unit 30 and its payload is ready to be fed to a FIFO memory block 38. A Pointer Interpreter (block 36) watches pointers of a particular frame of the fragment VC4A and transmits the information to a Pointer Generator block 40. According to the initial shift of the pointers (i.e., increment/decrement), the informational payload of the frame will be written into the FIFO 38 (see the commands "enable" and "write"). Information on the initial increment/decrement of the pointers is entered into the Pointer Generator Block 40. Information on the state of FIFO 38 is also introduced into the block 40. Based on the pointers' initial position, the FIFO clock and the outgoing signal clock, the Pointer Generator 40 prepares pointers of the outgoing signal (actual pointers). Similar operations are performed at the branch 34 with the copy fragment VC4a (which is intended to occupy a vacant time slot). Each of the Pointer Generators 40 and 41 informs the control unit 13 about the corresponding actual pointers' position (arrows 33 and 35). Based on this information, the control unit 13 issues to at least one of the Pointer Generators an increment/decrement request (arrows 43 and/or 45), so as to synchronize the timing of the two payloads under treatment by influencing pointers of the suitable fragment's frame. According to one embodiment of the delay equalizing means, the increment/decrement requests are introduced with the aid of software of the network manager. Upon issuance of the requests 43, 45, the pointer generators 40 and 41 issue suitable increment/decrement instructions (which retard or accelerate the frame) to the respective FIFO blocks 38 and 39, thereby changing depths of the FIFOs. The two payloads, while being read from the FIFO blocks, are accompanied by newly generated pointers, which incorporate the requested increment(s)/decrement(s). The two frames can then be issued from the parallel branches of the unit, as portions of synchronous fragments VC4A' and VC4a'; timing of the payloads in these frames will be identical. However, only one of the fragments (namely, the copy VC4a') will be enabled by the control unit 13 to enter the $2^{nd}$ cross-connect 28. As a result, the $2^{nd}$ cross-connect will create internal connection only for this fragment, out of the two illustrated in FIG. 4, so as to output the copy fragment VC4a' in the combination of the rearranged data stream (not shown). Actually, the enabling instruction of the block 13 may be used to output from the delay equalizing unit 30 only the selected fragment while blocking the second one.

It should be appreciated, that other embodiments and different locations of the delay equalizing means in the system may be proposed and should form part of the present invention.

What is claimed is:

1. A method of switching, in a telecommunication network, from a basic data stream to a copied data stream obtained by bridging of the basic data stream at a first network node, the method being characterized in that the switching is performed at a second network node receiving both the basic data stream and the copied data stream, by picking said copied data stream upon performing an operation of delay equalization between the basic data stream and the copied data stream.

2. A method of on-line rearrangement of an original data stream composed of two or more basic fragments transmitted in respective original time-slots, wherein one or more vacant data slots exist in the original data stream, the method comprises steps of:
   providing a first node and a second node interconnected to one another by a telecommunication path for transmitting the original data stream from the first node to the second node,
   bridging one or more of said basic fragments at the first node, to obtain one or more respective copied fragments respectively occupying one or more of the vacant time slots,
   transmitting the obtained one or more copied fragments to the second node along with said original data stream via the telecommunication path,
   performing the switching, according to claim 1, with respect to each of said copied fragments, wherein said basic fragment constitutes the basic data stream, said copied fragment constitutes the copied data stream, and said first and second nodes respectively constitute the first and the second network nodes, thereby ensuring substantially errorless rearrangement and obtaining a rearranged data stream.

3. The method according to claim 2, for rearranging SDH/SONET data streams.

4. The method according to claim 2, wherein the telecommunication path comprises one or more transmission lines.

5. The method according to claim 2, comprising:
multiplexing, after the step of bridging, all basic fragments of the original data stream with said one or more copied fragments into the form of an intermediate data stream to be transmitted to the second node, wherein the intermediate data stream includes fragments occupying all the original time-slots and said one or more vacant time slots;
demultiplexing the intermediate data stream at the second node.

6. A method of on-line rearrangement of an original data stream composed of two or more basic fragments transmitted in respective original time-slots, wherein one or more vacant data slots exist in the original data stream, the method comprises steps of:
providing a first network node and a second network node interconnected to one another by a telecommunication path,
bridging one or more of said basic fragments at the first node, to obtain one or more respective copied fragments respectively occupying one or more of the vacant time slots,
multiplexing all said basic fragments of the original data stream with said one or more copied fragments into an intermediate data stream including fragments occupying all the original time slots and said one or more vacant time slots;
transmitting said intermediate data stream to the second node via the communication path;
demultiplexing the intermediate data stream at the second node,
switching at said second node at least one of said basic fragments of the original data stream to at least one corresponding said copied fragment by:
defining at least one pair of bridged fragments, each pair comprising a particular basic fragment occupying one of said original time-slots, and a copied fragment of said basic fragment, occupying one of said vacant time-slots;
equalizing delays between the basic fragment and the copied fragment in said at least one pair;
assembling an outgoing data stream, using said at least one copied fragment instead of the respective at least one basic fragment, thereby obtaining the rearranged data stream comprising at least one fragment transmitted in a different time-slot than in the original data stream.

7. The method according to claim 6, further comprising a step of freeing one or more of the original time slots at the first node, for transmitting there-through one or more new signals.

8. The method according to claim 6, for rearranging SDH/SONET data streams.

9. The method according to claim 6, wherein the telecommunication path comprises one or more transmission lines.

10. A method of on-line rearrangement of an original data stream composed of two or more basic fragments transmitted in respective original time-slots, wherein one or more vacant data slots exist in the original data stream, the method comprises steps of:
providing a first node and a second node interconnected to one another by a telecommunication path,
bridging one or more of said basic fragments at the first node, to obtain one or more respective copied fragments respectively occupying one or more of the vacant time slots,
transmitting the obtained one or more copied fragments to the second node along with said original data stream via the telecommunication path,
switching at said second node at least one of said basic fragments of the original data stream to at least one respective said copied fragment upon performing an operation of delay equalization between said at least one basic fragment and said at least one respective copied fragment, to obtain a rearranged data stream,
wherein said delay equalizing operation comprises a step of pointers' justification with respect to at least one of said copied fragments and its corresponding basic fragment, while pointers of said basic fragment and the corresponding copied fragment serve mutual references to one another; payloads of standard frames of said fragments are thereby synchronized owing to mutual adjusting positions of said pointers.

11. The method according to claim 10, for rearranging SDH/SONET data streams.

12. The method according to claim 10, wherein the telecommunication path comprises one or more transmission lines.

13. A system for switching, in a telecommunication network, from a basic data stream to a copied data stream obtained by bridging of the basic data stream; the system comprises a first network node interconnected with a second network node via a telecommunication path; said first network node being capable of bridging said basic data stream, said second network node being intended for receiving both the basic data stream and the copied data stream; the system also comprising a network management block and a delay equalizing means operative to perform delay equalization between the basic data stream and the copied data stream at the second network node, said network management block further causing picking the copied data stream and dropping the basic data stream at the second network node.

14. The system according to claim 13, designed for on-line rearrangement of an original data stream being composed of basic fragments transmitted in respective original time-slots while one or more vacant time slots exist in the original data stream, wherein said basic data stream constitutes one of said basic fragments, and said copied data stream constitutes a copied fragment occupying one of said vacant time slots and obtained by bridging said basic fragment.

15. The system according to claim 13, designed for SDH/SONET data streams.

16. The system according to claim 13, wherein the telecommunication path comprises one or more transmission lines.

17. The system according to claim 13, wherein
the first node includes a Network Element (NE), comprising a first cross-connect device having an input stage and an output stage, and its control unit;
the second node includes a Network Element (NE), comprising a second cross-connect device having an input stage and an output stage, and its control unit;
the first node is provided with a MUX unit connected at its input stage to the output stage of the first cross-connect, and the second node is provided with a DEMUX unit, wherein the output stage of the MUX unit is connected to the input stage of the DEMUX unit via the telecommunication path;
the second node being also provided with the delay equalizing means connected between the output stage of the DEMUX unit and the input stage of the second cross-connect.

18. A system for switching, in a telecommunication network, from a basic data stream to a copied data stream obtained by bridging of the basic data stream; the system comprises a first network node interconnected with a second network node via a telecommunication path; said first network node being capable of bridging said basic data stream, said second network node being intended for receiving both the basic data stream and the copied data stream; the system also comprising a network management block and a delay equalizing means operative to perform delay equalization between the basic data stream and the copied data stream before dropping the basic data stream at the second network node, wherein said delay equalizing means are responsible for time aligning between the copied data stream and its corresponding basic data stream and comprises at least one unit capable of performing a pointers' justification operation for said copied data stream and its corresponding basic data stream, by using thereof as reference for one another.

19. The system according to claim 18, adapted for rearranging SDH/SONET data streams.

20. The system according to claim 18, wherein the telecommunication path comprises one or more transmission lines.

21. A system for on-line rearrangement of an original data stream, composed of two or more basic fragments transmitted in respective original time slots while one or more vacant time slots exist in the original data stream, into a rearranged data stream comprising at least one fragment transmitted in a different time slot than in the original data stream; the system comprises a first network node interconnected with a second network node via a telecommunication path; said first network node being capable of bridging one or more basic fragments of said original data stream to obtain respective one or more copied fragments in respective said vacant time slots, said second network node being intended for receiving both the original data stream and said one or more copied fragments; the system also comprising a network management block and a delay equalizing means operative to perform delay equalization between at least one basic fragment and the respective at least one copied fragment before dropping said at least one basic fragment, wherein the first node includes a Network Element (NE), comprising a first cross-connect device having an input stage and an output stage, and its control unit;

the second node includes a Network Element (NE), comprising a second cross-connect device having an input stage and an output stage, and its control unit;

the first node is provided with a MUX unit connected at its input stage to the output stage of the first cross-connect, and the second node is provided with a DEMUX unit, wherein the output stage of the MUX unit is connected to the input stage of the DEMUX unit via the telecommunication path;

the second node being provided with said delay equalizing means connected between the output stage of the DEMUX unit and the input stage of the second cross-connect, and wherein the network management block, via the control units of the first and second nodes, is capable of causing:

the first cross-connect device—to double one or more particular basic fragments so as to output all the fragments of the original data stream and copied fragments of the one or more basic fragments, the MUX unit—to produce the intermediate data stream from the fragments outputted from the first cross-connect, and the DEMUX unit—to restore said fragments upon transmission, the means for equalizing delays—to process at least one pair of said particular basic fragments and their respective copied fragments in a predetermined order;

the second cross-connect device—to form an outgoing data stream comprising the rearranged original data stream wherein said one or more basic fragments are respectively replaced with said one or more copied fragments.

22. The system according to claim 21, adapted for rearranging SDH/SONET data streams.

23. The system according to claim 21, wherein the telecommunication path comprises one or more transmission lines.

24. A method of switching, in a telecommunication network, from a basic data stream to a copied data stream obtained by bridging of the basic data stream at a first network node, the method being characterized in that the switching is performed at a second network node receiving both the basic data stream and the copied data stream, by picking said copied data stream upon performing an operation of delay equalization between the basic data stream and the copied data stream, wherein said delay equalizing operation comprises a step of pointers' justification with respect to said copied data stream and its corresponding basic data stream, while pointers of said two data streams serve mutual references to one another; payloads of standard frames of said two data streams are thereby synchronized owing to mutual adjustment of positions of said pointers.

25. The method according to claim 24, for rearranging SDH/SONET data streams.

26. The method according to claim 24, wherein the telecommunication path comprises one or more transmission lines.

* * * * *